United States Patent
Bibb, Jr. et al.

(10) Patent No.: US 10,133,584 B2
(45) Date of Patent: *Nov. 20, 2018

(54) MECHANISM FOR OBVIATING THE NEED FOR HOST-SIDE BASIC INPUT/OUTPUT SYSTEM (BIOS) OR BOOT SERIAL PERIPHERAL INTERFACE (SPI) DEVICE(S)

(71) Applicant: CISCO TECHNOLOGY, INC., San Jose, CA (US)

(72) Inventors: William Jackson Bibb, Jr., Gaston, OR (US); Sunil Bhagia, Olympia, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/449,935

(22) Filed: Mar. 4, 2017

(65) Prior Publication Data
US 2017/0177375 A1  Jun. 22, 2017

Related U.S. Application Data

(63) Continuation of application No. 14/300,505, filed on Jun. 10, 2014, now Pat. No. 9,594,571.

(51) Int. Cl.
*G06F 13/16* (2006.01)
*G06F 9/4401* (2018.01)
(Continued)

(52) U.S. Cl.
CPC ........ *G06F 9/4403* (2013.01); *G06F 13/1684* (2013.01); *G06F 21/572* (2013.01); *G06F 12/16* (2013.01); *G06F 2221/034* (2013.01)

(58) Field of Classification Search
CPC .................................................... G06F 9/4403
(Continued)

(56) References Cited

U.S. PATENT DOCUMENTS 7,487,343 B1  2/2009  Insley
9,262,637 B2  2/2016  Jacobs
(Continued)

OTHER PUBLICATIONS

Allgeuer, Robert, "Why Bother About BIOS Security," SANS Institute InfoSec Reading Room, Jul. 23, 2001, 10 pages.
(Continued)

*Primary Examiner* — Jaweed A Abbaszadeh
*Assistant Examiner* — Sumil M Desai
(74) *Attorney, Agent, or Firm* — Polsinelli PC

(57) ABSTRACT

The present disclosure describes several embodiments, e.g., a method, a baseboard management controller (BMC) system, a computer-readable non-transitory medium, for managing boot images for a computer system. These embodiments may include obtaining, by a BMC of the BMC system, a first boot image for the processor-based system, storing, by the BMC of the BMC system, the first boot image at a first location in a memory element of BMC system, and informing, by the BMC of the BMC system to a bus-to-memory bridge, first location information indicating a first location at which the first boot image is stored. The present disclosure also describes the bus-to-memory bridge which interfaces between a bus of the processor-based system and the memory element of the BMC system to allow one or more processors of the processor-based system to access the memory element of the BMC system to obtain boot image(s).

8 Claims, 8 Drawing Sheets

(51) Int. Cl.
*G06F 21/57* (2013.01)
*G06F 12/16* (2006.01)

(58) Field of Classification Search
USPC .............................................................. 713/2
See application file for complete search history.

(56) References Cited

U.S. PATENT DOCUMENTS

| | | |
|---|---|---|
| 9,594,571 B2 | 3/2017 | Bibb et al. |
| 2006/0136703 A1 | 6/2006 | Wisecup |
| 2008/0313312 A1 | 12/2008 | Flynn |
| 2013/0042098 A1 | 2/2013 | Baik |
| 2014/0006764 A1 | 1/2014 | Swanson |
| 2015/0331694 A1 | 11/2015 | Balakrishnan |

OTHER PUBLICATIONS

Cooper, David, et al., "BIOS Protection Guidelines: Recommendations of the National Institute of Standards and Technology," Special Publication 800-147, Computer Security Division, NIST National Institute of Standards and Technology, U.S. Department of Commerce, Apr. 2011, 26 pages.

"Intel Server Boards and Server Platforms, Server Management Guide," Intel part No. G37830-002, Intel Corporation, Oct. 2012, 137 pages.

Zhuo, Haihong, et al., "Remote Management with the Baseboard Management Controller in Eighth-Generation Dell PowerEdge Servers," Dell Power Solutions, Dell, Inc., Oct. 2004; 4 pages.

MECHANISM FOR OBVIATING THE NEED FOR HOST-SIDE BASIC INPUT/OUTPUT SYSTEM (BIOS) OR BOOT SERIAL PERIPHERAL INTERFACE (SPI) DEVICE(S)

PRIORITY DATA

This is a continuation patent application of (and claims the benefit of priority under 35 U.S.C. § 120) of U.S. application Ser. No. 14/300,505, filed Jun. 10, 2014, entitled "MECHANISM FOR OBVIATING THE NEED FOR HOST-SIDE BASIC INPUT/OUTPUT SYSTEM (BIOS) OR BOOT SERIAL PERIPHERAL INTERFACE (SPI) DEVICE(S)," Inventors: William Jackson Bibb Jr. et al. The disclosure of the prior application is considered part of and is incorporated by reference in the disclosure of this application in its entirety.

TECHNICAL FIELD

This disclosure relates in general to the field of computer architecture design and, more particularly, to a mechanism for obviating the need for basic input/output system (BIOS) serial peripheral interface (SPI) device(s).

BACKGROUND

Modern day computer systems are ubiquitous, and these computer systems can have different shapes and sizes, from personal computers (e.g., work stations, laptops, gaming consoles) to specialized computers (e.g., high performance networking equipment), to super computers (e.g., highly specialized computers or clusters of computers used to perform computationally intensive tasks). Designing computer systems and architectures is not a trivial task. Objectives for various designs can include speed, cost, complexity, and security.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
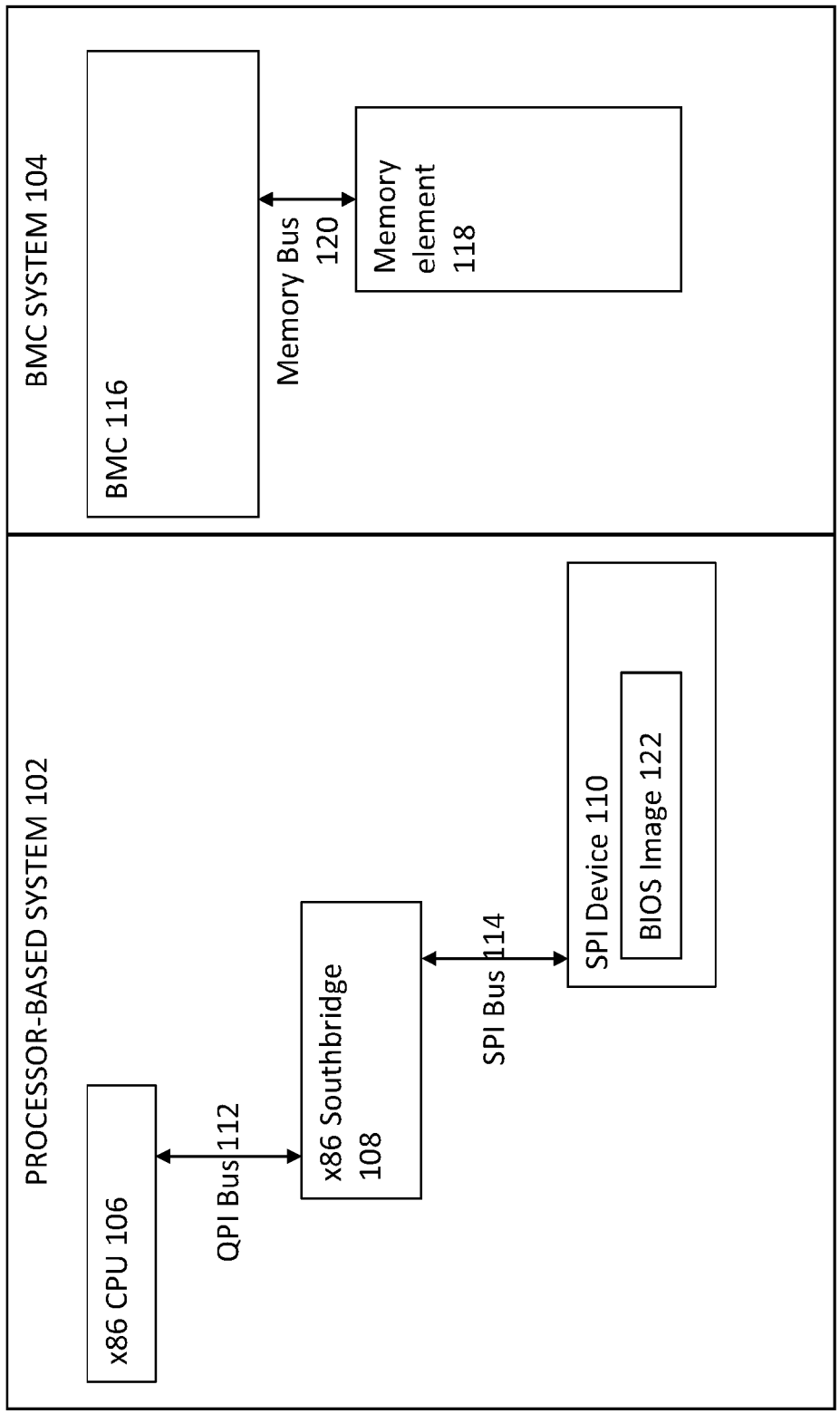
FIG. 1 shows an illustrative computer system comprising a processor-based system according to an x86 architecture and a baseboard management controller (BMC) system.

A method for managing boot images for a computer system is described. The computer system comprises a processor-based system and a baseboard management controller (BMC) system. The BMC of the BMC system obtains a first boot image for the processor-based system. The BMC of the BMC system stores the first boot image at a first location in a memory element of BMC system. The BMC of the BMC system informs first location information indicating a first location at which the first boot image is stored to a bus-to-memory bridge. The bus-to-memory bridge interfaces between a bus of the processor-based system and the memory element of the BMC system to allow one or more processors of the processor-based system to access the memory element of the BMC system.

A baseboard management controller (BMC) system for managing boot images is also disclosed. The computer system comprises the BMC system and a processor-based system. Specifically, the BMC system for managing boot images comprises at least one memory element, at least one processor coupled to the at least one memory element, and a BMC. The BMC, that when executed by the at least one processor, is configured to obtain a first boot image for the processor-based system, store the first boot image at a first location in a memory element of BMC system, and inform, to a bus-to-memory bridge, first location information indicating the first location at which the first boot image is stored. The bus-to-memory bridge interfaces between a bus of the processor-based system and the memory element of the BMC system to allow one or more processors of the processor-based system to access the memory element of the BMC system.

A computer-readable non-transitory medium comprising one or more instructions for managing boot images for a computer system is also disclosed. The computer system comprises the BMC system and a processor-based system. The medium, that when executed on a processor, configures the processor to perform one or more operations comprising obtaining, by a BMC of the BMC system, a first boot image for the processor-based system, storing, by the BMC of the BMC system, the first boot image at a first location in a memory element of BMC system, and informing, by the BMC of the BMC system to a bus-to-memory bridge, first location information indicating the first location at which the first boot image is stored. The bus-to-memory bridge interfaces between a bus of the processor-based system and the memory element of the BMC system to allow one or more processors of the processor-based system to access the memory element of the BMC system.

A bus-to-memory bridge for virtualizing boot images usable for booting a computer system comprising a processor-based system and a baseboard management controller (BMC) system. The bus-to-memory bridge comprises a first interface to a bus of the processor-based system for receiving a transaction initiated by a processor of the processor-based system to access a first boot image stored on a memory element of the BMC system. Furthermore, the bus-to-memory bridge comprises a proxy between the first interface and the second interface for translating the received transaction to a translated transaction suitable for a memory bus of the BMC system connecting the bus-to-memory bridge to the memory element. Moreover, the bus-to-memory bridge comprises a second interface to the memory bus of the BMC system for issuing the translated transaction onto a memory bus of the BMC system to access the first boot image stored on a memory element of the BMC system.

EXAMPLE EMBODIMENTS

Understanding Processor-Based Systems

Sophisticated computer systems interconnect many devices together to deliver a variety of rich applications. Typically, the computer system includes a host-side processor-based system which would include one or more processors (e.g., masters) connected to a plurality of peripheral devices (e.g., slaves). The one or more processors can execute instructions for performing a task. The peripheral devices can provide a specific function, and can include memory/storage devices, dedicated/specialized processors, input/output devices, communication interfaces, and so forth.

To configure the computer system properly upon power on or booting up of the system, a processor-based system would first execute a piece of software ("firmware") to initialize and test the system hardware components of the processor-based system. Furthermore, this piece of software can allow the processors to kick off an operating system. This piece of software enables the processor-based system to discover and setup peripheral devices such that those peripheral devices are made accessible to the processor(s), etc. This piece of software is crucial to the proper power on and operation of the computer system. This piece of software can be referred to as the Basic Input/Output System (BIOS) for an x86-based architecture, or referred to as the Bootloader for an ARM-based architecture. The piece of software is typically stored as an image (e.g., as a BIOS image or a Boot image) in a (peripheral) memory device of the processor-based system. Within the context of the disclosure, the term "boot image" encompasses both BIOS images and Boot images. The computer system can have one or more boot images. For instance, the computer system can have different versions of the boot image, different boot images for loading different operating systems, different boot images for operating the computer system in different modes, etc.

As processor-based systems become more complicated, modern computers now include another group of devices dedicated to monitoring the computer system as a whole. Typically, a board of the computer system may also include a baseboard management controller (BMC) system to monitor the physical state of the processor-based system and the computer system as a whole.

Generally speaking, BMC systems can monitor the physical state of a processor-based system or the computer system as a whole using sensors on the board. The sensors of a BMC measure internal physical variables such as temperature, humidity, power-supply voltage, fan speeds, communications parameters and operating system (OS) functions. An administrator can view information associated with the physical state of the processor-based system via a separate communication channel. For instance, a graphical user interface or terminal can be provided, over a hardware connection or over a network connection, to allow the administrator to view the physical state of the processor-based system. Besides monitoring the physical state of the processor-based system, the administrator can also use the interface/terminal, via the BMC system, to reboot or power cycle the processor-based system.

Within this disclosure, the processor-based systems can be referred to as "the host-side", and the BMC systems can be referred to as the "BMC-side". In some cases, the host-side activities may also be known as the "data plane" and the BMC-side activities may also be known as the "management plane."

One Example: Computer System According to the x86 Architecture

FIG. 1 shows an illustrative computer system comprising a processor-based system 102 according to an x86 architecture and a baseboard management controller (BMC) system 104. Typically, the processor-based system 102 and the baseboard management controller system 104 are provided together as a computer system, e.g., on the same board of the computer system.

The processor-based system 102 can include an x86 computer processing unit (CPU) 106, an x86 Southbridge 108, and a (Serial Peripheral Interface (SPI)) device 110 having a BIOS image 122 thereon. The x86 CPU 106 connects, via a point-to-point processor interconnect network, such as the QuickPath Interconnect (QPI) bus 112, to the x86 Southbridge 108 to communicate with peripheral devices. While not shown in the FIGURE, other x86 CPUs can also be provided in the processor-based system 102, interconnected among devices in the processor-based system via the point-to-point interconnect network. The x86 Southbridge 108, via a bus in the processor-based system, such as the SPI bus 114, can enable x86 CPU 106 to communicate with the peripheral devices of the processor-based system. For instance, via the QPI Bus 112 and the SPI Bus, the x86 CPU 106 can access the BIOS image 122 stored in the SPI device 110 (e.g., a non-volatile memory element, such as a Read Only Memory (ROM) chip, Electrically Erasable Programmable Read-Only Memory (EEPROM) chip). For simplicity, only one BIOS image is shown, but a plurality of BIOS images can be stored on one or more peripheral devices of the processor-based system.

The BMC system 104 includes BMC 116 and a memory element 118 (e.g., volatile memory element). Typically, the BMC 116 is a module running on one or more processors of the BMC system 104, that when executed by the one or more processors, is configured to carry out monitoring functions of the computer system as a whole, or provide functions which support the functions on the host-side/processor-based system 102. The functions of the BMC 116 may be carried out by the one or more processors executing instructions stored on computer-readable non-transitory medium of the BMC system. The BMC 116 can communicate with the memory element 118 via a memory bus 120 or interface. The memory element 118 can store data and/or instructions associated with the monitoring functions. One example of the memory element 118 is Dynamic Random Access Memory (DRAM), and the BMC 116 can communicate with DRAM over the memory bus 120 (e.g., a DRAM bus).

Examples of DRAM buses/interfaces include single data rate (SDR) and double data rate (DDR) interfaces.

One Example: Computer System According to the ARM Architecture

Figure 2:
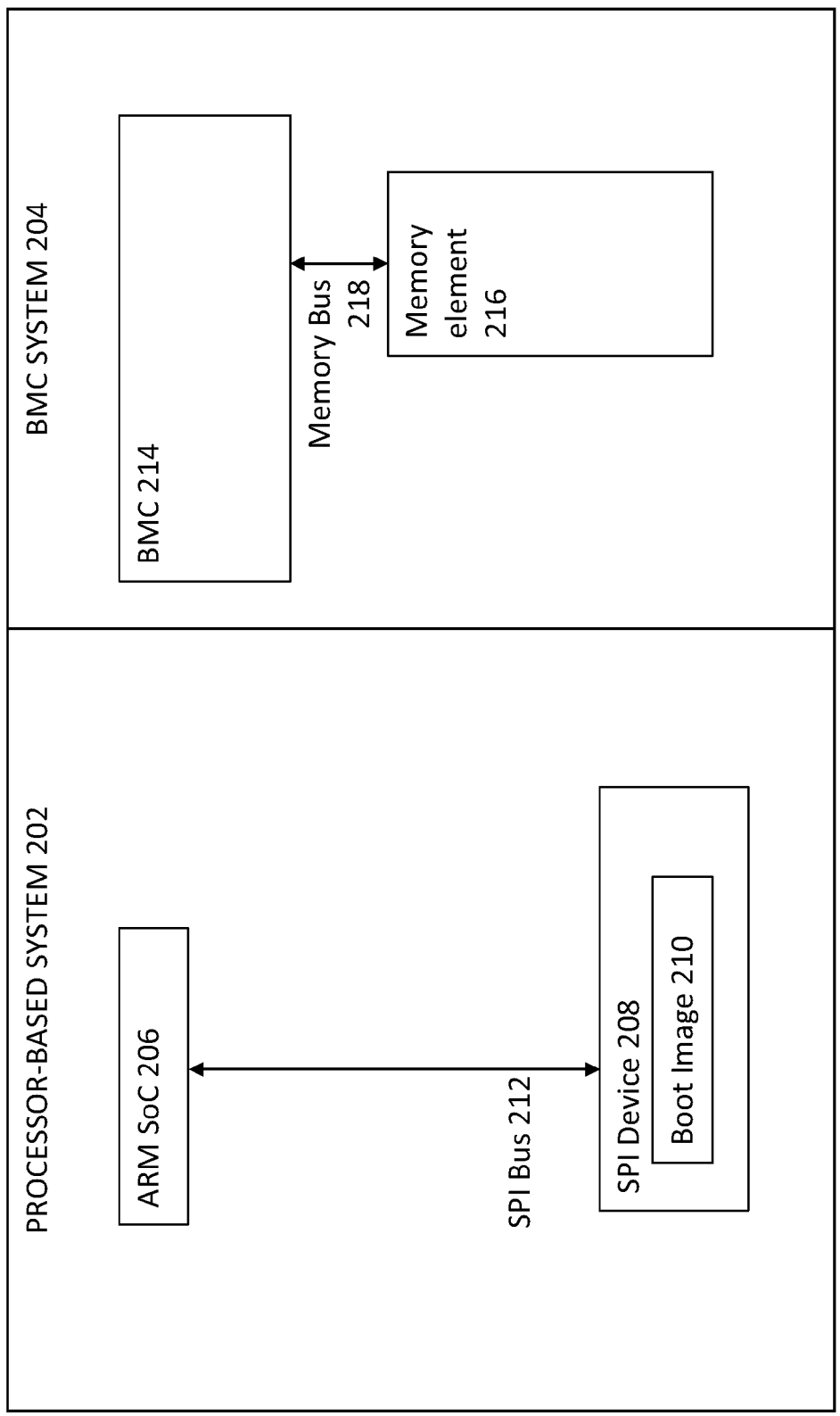
FIG. 2 shows an illustrative computer system comprising a processor-based system according to an ARM architecture and a baseboard management controller (BMC) system.

FIG. 2 shows an illustrative computer system comprising a processor-based system 202 according to an ARM architecture and a baseboard management controller (BMC) system 204. The processor based system 202 includes an ARM System on Chip (SoC) processor 206 and a (Serial Peripheral interface (SPI)) device 110 having a Boot image 112 stored thereon. Instead of having a Southbridge, the ARM SoC processor 206 connects with peripheral devices (directly), via a bus of the processor-based system such as the SPI bus 212. For instance, via the SPI bus 212, the ARM SoC processor can access the Boot image 210 stored on the SPI device 208 (e.g., a non-volatile memory element). For simplicity, only one Boot image is shown, but a plurality of BIOS images can be stored on one or more peripheral devices of the processor-based system.

The BMC system 204 (similar to BMC 104 in FIG. 1) includes BMC 214 and a memory element 216 (e.g., volatile memory element). Typically, the BMC 214 is a module running on one or more processors of the BMC system 204, that when executed by the processor, is configured to carry out monitoring functions of the computer system as a whole, or provide functions which support the functions on the host-side/processor-based system 202. The functions of the BMC 214 may be carried out by the one or more processors executing instructions stored on computer-readable non-transitory medium of the BMC system. The BMC 216 can communicate with the memory element 216 via a memory bus 218 or interface. The memory element 216 can store data and/or instructions associated with the monitoring functions. One example of the memory element 216 is Dynamic Random Access Memory (DRAM), and the BMC 214 can communicate with DRAM over the memory bus 218 (e.g., a DRAM bus). Examples of DRAM buses/interfaces include single data rate (SDR) and double data rate (DDR) interfaces.

Figure 3:
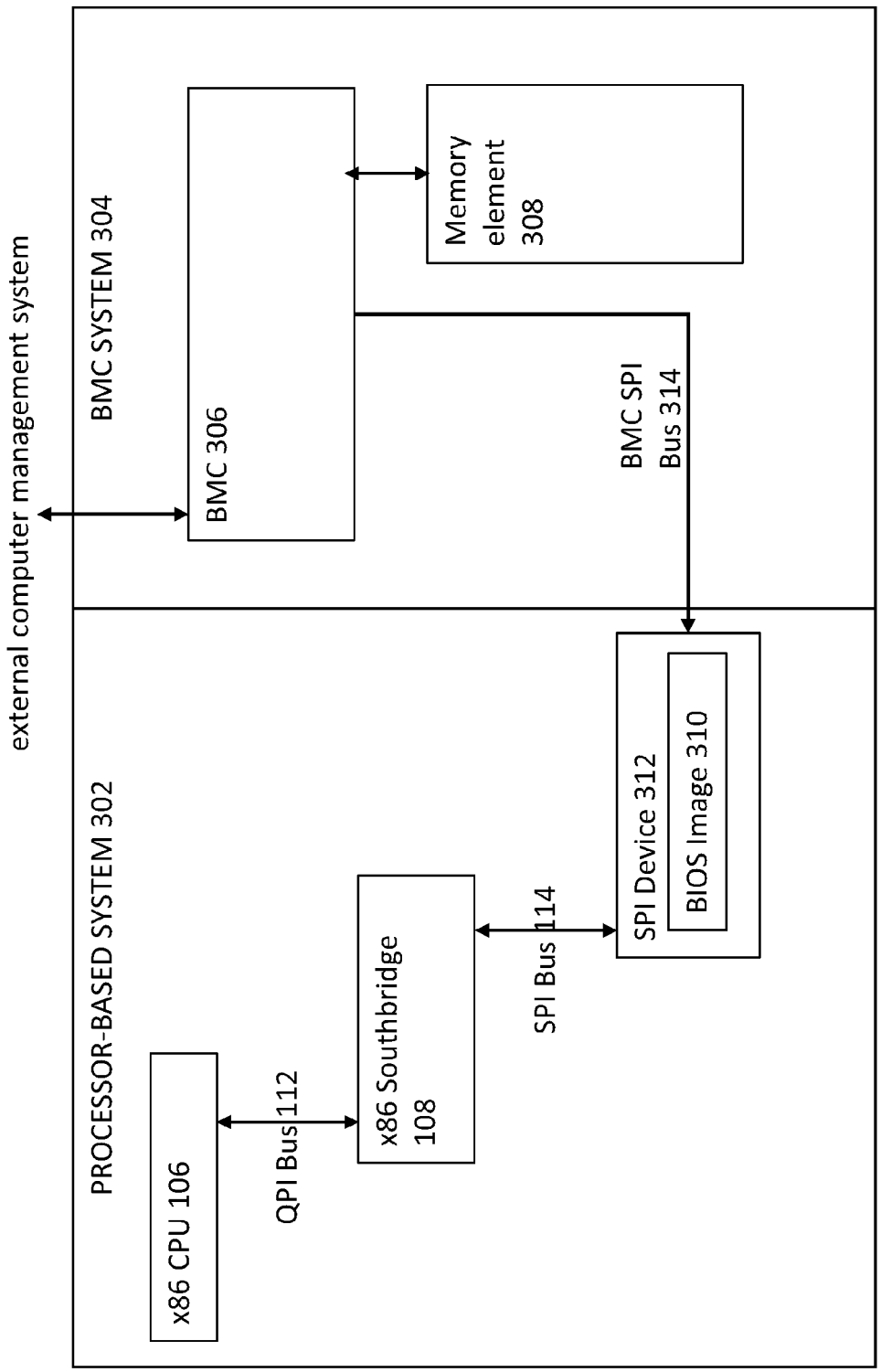
FIG. 3 shows an illustrative computer system comprising a processor-based system according to an x86 architecture and a baseboard management controller (BMC) system.

One Example: Computer System According to the x86 Architecture having a Different BMC System FIG. 3 shows an illustrative computer system comprising a processor-based system 302 according to an x86 architecture and a (modified) baseboard management controller (BMC) system 304. In this illustration, the BMC system 304 (having a BMC 306 and memory element 308) is further configured to enable updates to the BIOS image 310 stored on SPI device 312. Through this modified BMC system 304, the BMC 306 can enable new BIOS image(s) to be loaded on the SPI device 312 to be used as the (new) default BIOS image(s). The processor-based system 302 is rebooted by the BMC 304, and upon power up, the processor-based system 302 would load the new default BIOS image(s) stored in SPI device 312. The BMC 306, equipped with this management functionality, can allow administrators to perform "BIOS update" by loading new BIOS images to the SPI device 312 independent from the processor-based system 302.

The BMC system 304, in particular, the BMC 306, may include a connection (e.g., via a terminal at the computer system, or over a network) to an external computer management system where users can provide updates to BIOS images or load new BIOS images. The BMC 306 can obtain a new BIOS image to be installed, and stores the new BIOS image to the memory element 308 (e.g., volatile memory element, such as DRAM). Via a processor-to-peripheral interconnect, e.g., a BMC SPI bus 314, the BMC 306 can transfer and load the new BIOS image to SPI device 312. Such an added management functionality can be particularly useful for administrators when managing computer systems (e.g., networking equipment) remotely.

Figure 4:
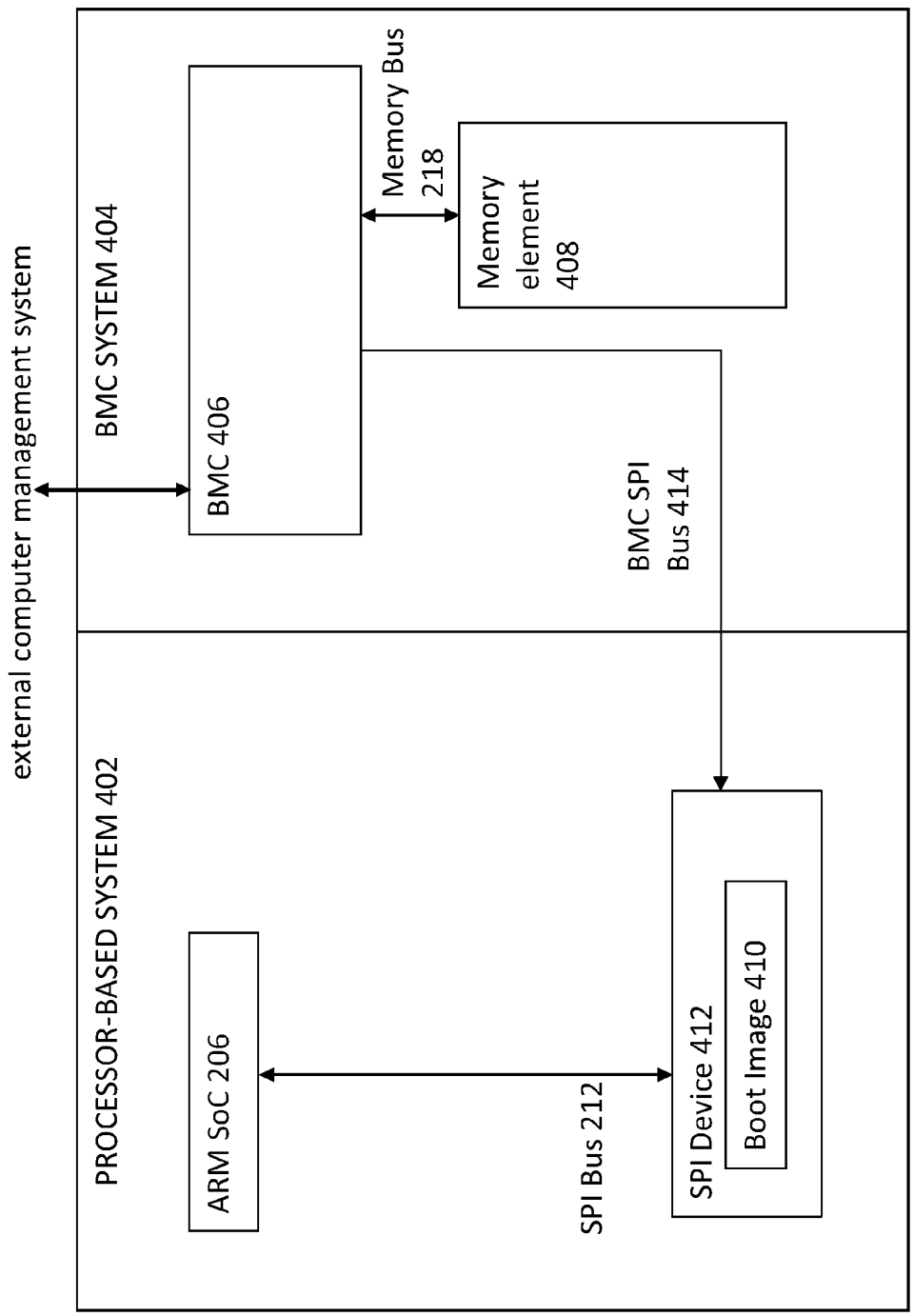
FIG. 4 shows an illustrative computer system comprising a processor-based system according to an ARM architecture and a baseboard management controller (BMC) system.

One Example: Computer System According to the ARM Architecture having a Different BMC System The added management functionality described in relation to FIG. 3 can also be used in the ARM architecture. FIG. 4 shows an illustrative computer system comprising a processor-based system 402 according to an x86 architecture and a (modified) baseboard management controller (BMC) system 404. In this illustration, the BMC system 404 (having a BMC 406 and memory element 408) is further configured to enable updates to the Boot image 410 stored on SPI device 412. Through this modified BMC system 404, the BMC 406 can enable new Boot image(s) to be loaded on the SPI device 412 to be used as the (new) default Boot image(s). The processor-based system 402 is rebooted by the BMC 404, and upon power up, the processor-based system 402 would load the new default Boot image(s) stored in SPI device 412. The BMC 406, equipped with this management functionality, can allow administrators to perform "Boot update" by loading new Boot images to the SPI device 412 independent from the processor-based system 402.

The BMC system 404, in particular, the BMC 406, may include a connection (e.g., via a terminal at the computer system, or over a network) to an external computer management system where users can provide updates to Boot images or load new Boot images. The BMC 406 can obtain a new Boot image to be installed, and stores the new Boot image to the memory element 408 (e.g., volatile memory element, such as DRAM). Via a processor-to-peripheral interconnect, e.g., a BMC SPI bus 414, the BMC 406 can transfer and load the new Boot image to SPI device 412. Such an added management functionality can be particularly useful for administrators when managing computer systems (e.g., networking equipment) remotely.

Concerns Related to BIOS Images and Boot Images

The BIOS image and the Boot image include critical functions for ensuring that the computer system is setup and operates properly. If the functions are modified, e.g., by a malicious party, a compromised BIOS image or a compromised Boot image can cause the computer system to operate and carry out undesirable operations, or cause the computer system to cease functioning altogether. For this reason, protecting the integrity of the BIOS or Boot image is important to the overall security of the computer system. Furthermore, the physical presence of SPI devices on the host-side increases the Bill of Materials (BOM) cost, increases the x86 vulnerability to virus and malware attack, and requires that these SPI devices be frequently updated as newer BIOS images are released. Different designs for providing the BIOS and Boot image in the computer system can affect the level of security provided to the BIOS/Boot images. The following passages examine the illustrations in FIGS. 1-4 in detail.

Referring to FIG. 1, if the BIOS image 112 is to be updated, the x86 CPU 106 (on the host-side) is responsible for updating the BIOS image 112 stored on the SPI device 110. If the host-side has been compromised with a virus, the virus can potentially execute malicious instructions to modify the BIOS image 112 on the SPI device 118. Referring to FIG. 2, if the Boot image 210 is to be updated, the ARM SoC processor 206 (on the host-side) is responsible for updating the Boot image 210 stored on the SPI device 208. Similar to FIG. 1, if the host-side of FIG. 2 has been compromised with a virus, the virus can potentially execute malicious instructions to modify the BIOS image 210 on the SPI device 210.

Referring to FIGS. 3 and 4, an additional path (e.g., the BMC SPI bus 314 and BMC SPI bus 414) allows the BMC system to update the BIOS/Boot image(s). This configuration can allow the BMC-side to validate any new BIOS/Boot images being loaded onto the SPI devices. However, if the host-side has been compromised with a virus, the virus can potentially execute malicious instructions to modify the BIOS/Boot images, leaving the computer system vulnerable to such an attack without protection from the BMC-side.

In all the architectures shown in FIGS. 1-4, the SPI devices 110, 208, 312, and 412, typically EEPROM/ROM chips or some other discrete memory elements, can be physically removed from the board of the computer system. If a malicious party has physical access to the board of the computer system, the malicious party can remove the SPI device from the board and replace the SPI device with a new SPI device having a comprised BIOS/Boot image stored thereon, causing the host-side to load the comprised BIOS/Boot image upon reboot.

An Improved Computer System: Managing BIOS/Boot Images in a BMC DRAM

Recognizing some of the issues described above related to BIOS/Boot image security, an improved computer system is provided where the BIOS/Boot image(s) are no longer stored in the SPI device on the host-side. Rather, the BIOS/Boot images are stored in a memory element in the BMC-side. The memory element can be a volatile memory element such as Random Access Memory (RAM), or Dynamic Random Access Memory (DRAM). In other words, the BIOS/Boot image is relocated from the SPI device in the host-side (attached to the x86 Southbridge or to the ARM SoC processor), to a memory element (e.g., DRAM) in the BMC-side. A bus-to-memory bridge (e.g., an SPI-DRAM bridge) is added to the BMC system to make the BIOS/Boot image(s) stored on the memory element in the BMC-side available to the host-side as an SPI device. For instance, the bus-to-memory bridge can advertise or announce to the x86 Southbridge 108 (and/or other devices on the host-side) that the bus-to-memory bridge is an SPI device having the BIOS/Boot image(s). Accordingly, the host-side can access the BIOS/Boot image(s) transparent to the fact that the BIOS/Boot image(s) are now stored on a memory element on the BMC-side. The bridge allows the host-side to load the BIOS/Boot image normally, and the architectural change is transparent to host-side processors.

By not storing the BIOS/Boot image in the SPI devices shown in FIGS. 1-4, the improved architecture would avoid the danger of a malicious party from physically removing a ROM chip being used as the SPI device to replace the BIOS/Boot image with a compromised one. The BIOS image is hidden in the BMC DRAM within the execution environment of the BMC system. Furthermore, the BIOS/Boot image is under the responsibility and control of the BMC system, which can offer additional functions to better protect the integrity of the BIOS/Boot image (when compared to the architecture where the BIOS/Boot image operates within the host-side environment). Details of the improved architectures are described in system diagrams of FIGS. 7-9.

Exemplary Methods for Managing Boot Images for a Computer System

Figure 6:
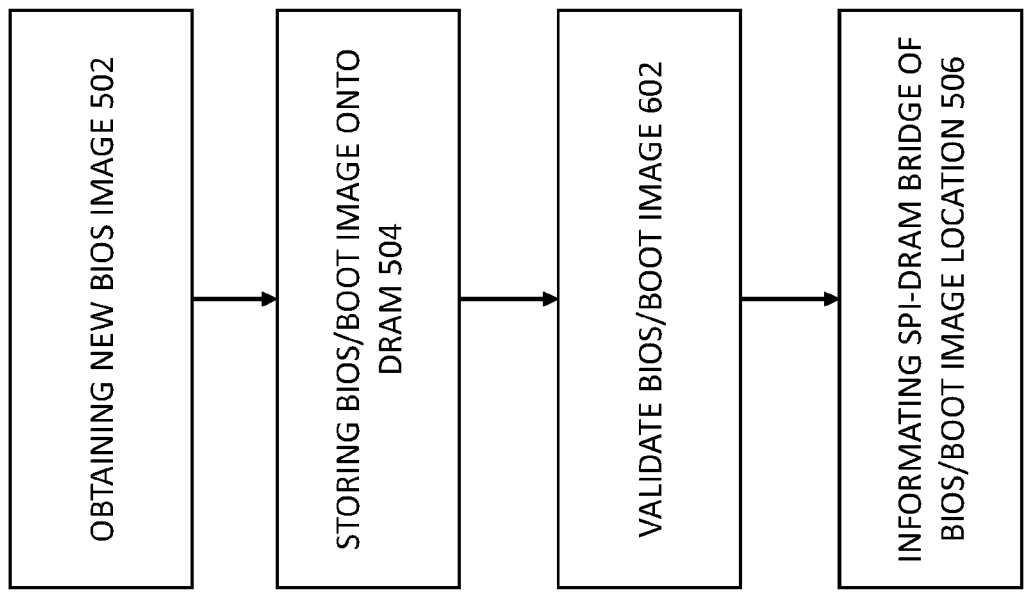
FIG. 6 shows a flow diagram illustrating a process for managing boot images for a computer system comprising the BMC system and a processor-based system, according to some embodiments of the disclosure.
Figure 5:
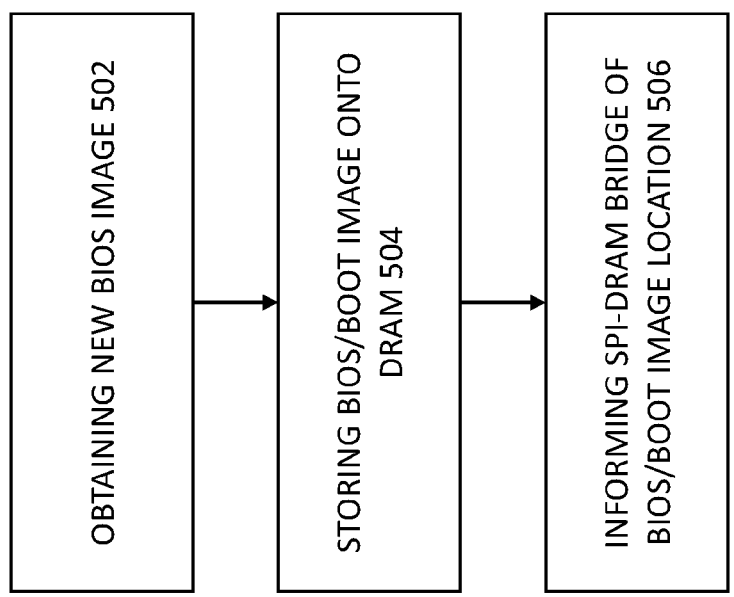
FIG. 5 shows a flow diagram illustrating a process for managing boot images for a computer system comprising the BMC system and a processor-based system, according to some embodiments of the disclosure.

As described above, the improved computer system stores the BIOS/Boot images (or referred to herein simply as boot images) in a memory element of the BMC system. Further-more, a bus-to-memory bridge is provided to allow the host-side to access the BIOS/boot images. FIGS. 5 and 6 illustrate the processes carried out by the improved computer system.

FIG. 5 shows a flow diagram illustrating a process for managing boot images for a computer system comprising the BMC system and a processor-based system, according to some embodiments of the disclosure. The process can be used for managing one or more boot images. The process includes obtaining, by a BMC of the BMC system, a first boot image for the processor-based system (box 502). The first boot image can be a revised boot image an administrator wishes to use for the computer system. The BMC may have a connection to an external computer management system via which the BMC can obtain the first boot image from the administrator.

After obtaining the first boot image, the BMC of the BMC system stores the first boot image at a first location in a memory element of BMC system (box 504). For instance, BMC can transfer the boot image over a memory bus to be stored in a part of the memory element. The memory element can be volatile memory such as DRAM. The BMC of the BMC system can then inform to a bus-to-memory bridge, first location information indicating a first location at which the first boot image is stored (box 506).

Broadly speaking, the first location information supplies the necessary information to the bus-to-memory bridge for accessing the area of memory occupied by the first boot image. The first location information can include a memory address where the first boot image begins in the memory element. The first location information can further include the size of the first boot image and/or the memory address where the first boot image ends in the memory element.

The bus-to-memory bridge interfaces between a bus of the processor-based system (e.g., a SPI bus) and the memory element of the BMC system (e.g., a DRAM) to allow one or more processors of the processor-based system to access the memory element of the BMC system. The first location information provided from the BMC to the bus-to-memory bridge thus configures the bus-to-memory bridge to access the first boot image from a proper location of the memory element. The bus-to-memory bridge is then configured to virtualize the first boot image stored in the memory element of the BMC system and present the bus-to-memory bridge to the processor-based system as an SPI device having the first boot image. As a result, the bus-to-memory bridge can provide the one or more processors of the processor-based system access to the first boot image from the memory element. It is noted that typically, boot processors on the host-side can access the bus-to-memory bridge (and in some cases application processors may not have access to the bus-to-memory bridge.)

If the first boot image is to be replaced or updated, the process can further include obtaining, by the BMC of the BMC system, a second boot image for the processor-based system, wherein the second boot image updates the first boot image. The second boot image can be obtained in a similar way, via a connection to an external computer management system. The process further includes storing, by the BMC of the BMC system, the second boot image at a second location in a memory element of BMC system different from the first location. To allow the bus-to-memory bridge to access the second boot image, the BMC of the BMC system informs, to a bus-to-memory bridge, second location information indicating the second location at which the first boot image is stored. The second information (similar to the first information), supplies the necessary information to the bus-to-memory bridge for accessing the area of memory occupied by the second boot image.

By storing the BIOS/Boot image in the BMC system, one or more validation functions can be implemented in the BMC system to provide additional security for the BIOS/Boot images stored in the memory element of the BMC system. FIG. 6 shows a flow diagram illustrating a process for managing boot images for a computer system comprising the BMC system and a processor-based system, according to some embodiments of the disclosure. The process additionally includes, after storing the first boot image in the memory element of the BMC system and prior to informing the first location information indicating the first location to the bus-to-memory bridge, validating the first boot image by a security module of the BMC system. In a similar fashion, the process can additionally include after storing the second boot image in the memory element of the BMC system and prior to informing the second location to the bus-to-memory bridge, validating the second boot image by a security module of the BMC system. This validation process ensures that the first/second boot images have been validated before the boot images are made available to the processor-based system.

This validation process, which although was possible in the systems shown in FIGS. 3 and 4, can be executed by the security module at any suitable point in time, irrespective of the state of the processor-based system. This provides additional security for the BIOS/Boot images when the validation process can be initiated by the BMC, and can, in many cases, close the window of opportunity during which a malicious party is able to manipulate with the BIOS/Boot images. For instance, security module can detect whether the processor-based system has powered off, and in response to detecting that the processor-based system has powered off, validate the first boot image by a security module of the BMC system. In another instance, the security module can validate the first boot image when the processor-based system is powered on, and/or when the processor-based system is accessing the first boot image. By being within the execution environment of the BMC system, a security module can even monitor accesses made via the bus-to-memory bridge to assess whether the processor-based system has been compromised and is attempting to access the BIOS/Boot images in a malicious manner. These steps performed by the security module are also applicable to other boot images (e.g., the second boot image) under maintenance by the BMC system.

Validation, within the context of this disclosure, can include a variety of operations on the BIOS/Boot image to ensure that the image has not been compromised. For instance, validating the first boot image can include checking whether the first boot image is corrupted. In another instance, validating the first boot image can include checking whether the first boot image has a valid signature.

Besides validation, the improved system provides extra security when the system is powered down. When the blade (having both the host-side and the BMC-side) is physically powered down, there is no BIOS image anywhere on the blade. This makes it impossible for a malicious individual to physically obtain or replace the BIOS image while the blade is powered down. Previous implementations allow malicious individuals to obtain the BIOS image either via JTAG (Standard Test Access Port and Boundary-Scan Architecture standard developed by Joint Test Action Group), via removal of the part, and/or reading the image from the part.

Example of the Improved Computer System According to the x86 Architecture

Figure 7:
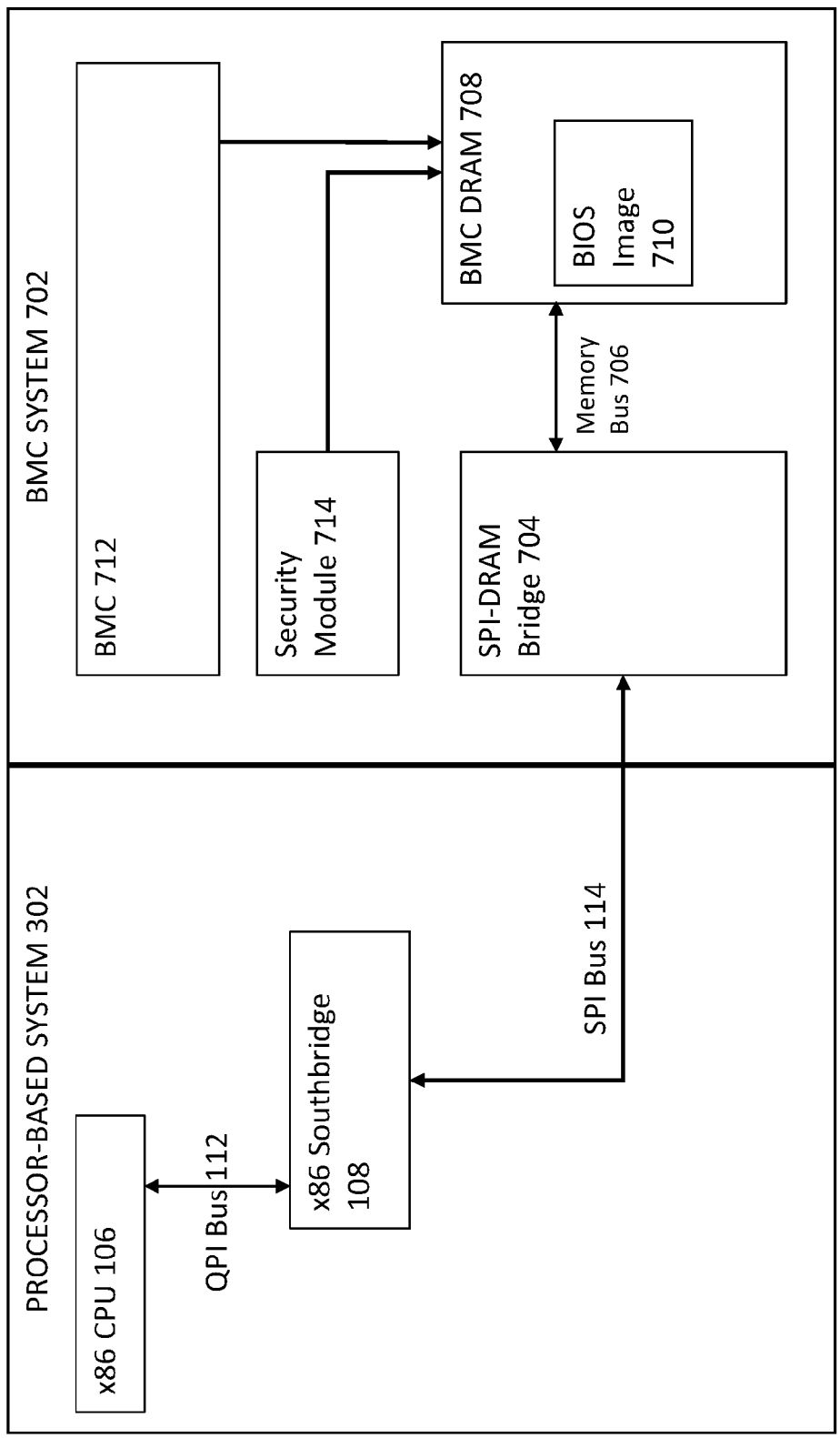
FIG. 7 shows an improved computer system comprising a processor-based system according to an x86 architecture and a baseboard management controller (BMC) system, where a memory element in the BMC system stores one or more BIOS images, according to some embodiments of the disclosure.

FIG. 7 shows an improved computer system comprising a processor-based system 302 according to an x86 architecture and a baseboard management controller (BMC) system 702, where a memory element in the BMC system 702 stores one or more BIOS images, according to some embodiments of the disclosure. In FIG. 7, the computer system of FIG. 3 is modified to include an improved BMC system 702, where one or more BIOS images are managed by the BMC system 702 and stored in the BMC DRAM 714 (the memory element of the BMC system 702). The BMC 712, the BMC DRAM 714, the security module 716, and the SPI-DRAM bridge 704 (the bus-to-memory bridge) are configured to carrying out the processes outlined in FIGS. 5 and 6. Rather than connecting SPI bus 114 to an SPI device, the SPI bus 114 of FIG. 7 is connected to a bus-to-memory bridge, shown as SPI-DRAM bridge 704. The bus-to-memory bridge connects, via a memory bus 706, to a memory element of the BMC system 702 (shown as BMC DRAM 708). The BIOS image 710 on the BMC DRAM 708 can be accessed by x86 CPU 106 via the QPI bus 112, the x86 Southbridge 108, the SPI bus 114, the SPI-DRAM bridge 704, and the memory bus 706.

Example of the Improved Computer System According to the ARM Architecture

Figure 8:
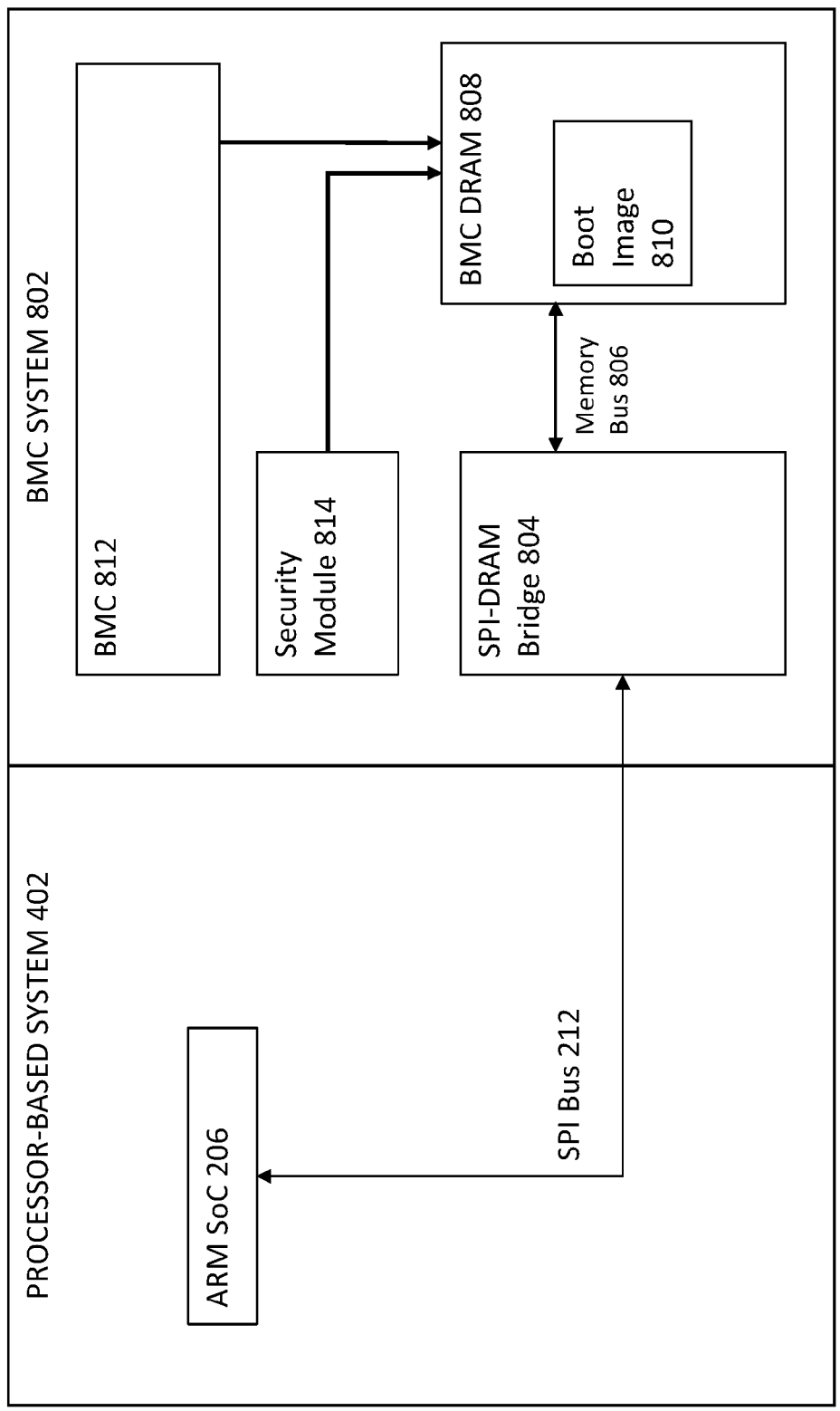
FIG. 8 shows an improved computer system comprising a processor-based system according to an ARM architecture and a baseboard management controller (BMC) system, where a memory element in the BMC system stores one or more boot images, according to some embodiments of the disclosure.

FIG. 8 shows an improved computer system comprising a processor-based system 402 according to an ARM architecture and a baseboard management controller (BMC) system 802, where a memory element in the BMC system 802 stores one or more boot images, according to some embodiments of the disclosure. In this improved system, the computer system of FIG. 4 is modified to include an improved BMC system 802, where one or more boot images are managed by the BMC system 802 and stored in the BMC DRAM 814 (the memory element of the BMC system 802). The BMC 812, the BMC DRAM 814, the security module 816, and the SPI-DRAM bridge 804 (the bus-to-memory bridge) are configured to carrying out the processes outlined in FIGS. 5 and 6. Rather than connecting SPI bus 212 to an SPI device, the SPI bus 212 of FIG. 4 is connected to a bus-to-memory bridge, shown as SPI-DRAM bridge 804. The bus-to-memory bridge connects, via a memory bus 806, to a memory element of the BMC system 802 (shown as BMC DRAM 808). The Boot image 810 on the BMC DRAM 808 can be accessed by ARM SoC processor 206 via the SPI bus 212, the SPI-DRAM bridge 804, and the memory bus 806.

Example of the Improved Bus-To-Memory Bridge

Figure 9:
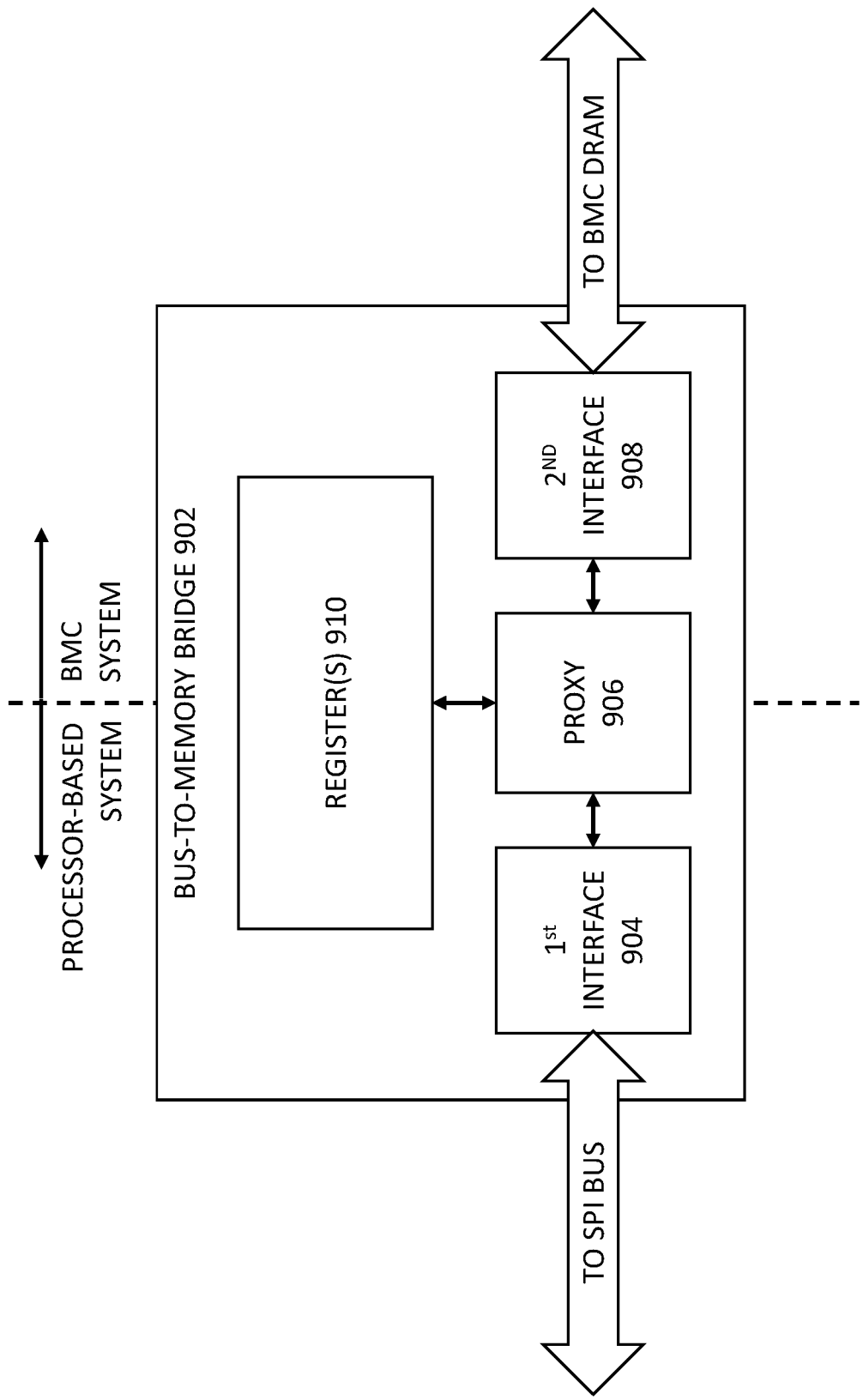
FIG. 9 shows a bus-to-memory bridge provided in the baseboard management controller (BMC) system, according to some embodiments of the disclosure.

FIG. 9 shows a bus-to-memory bridge 902 provided in the baseboard management controller (BMC) system, according to some embodiments of the disclosure. The bus-to-memory bridge 902, e.g., implementing the SPI-DRAM bridge 704 and SPI-DRAM bridge 804 of FIGS. 7 and 8, respectively, can proxy transactions initiated by one or more processors of the processor-based system onto a memory bus of the BMC system connecting the bus-to-memory bridge to the memory element. The resulting bus-to-memory bridge allows the one or more processors of the processor-based system to access the boot images stored in the memory element of the BMC system (e.g., the BMC DRAM 708 and BMC DRAM 808 of FIGS. 7 and 8, respectively). In other words, the bus-to-memory bridge 902 can virtualize boot images used to boot a computer system stored in a memory element in the BMC system as an SPI device accessible by the host-side system. The bus-to-memory bridge 902 comprises a first interface (the interface for the bus, e.g., the SPI bus on the host side), a proxy, and a second interface (the interface for the memory bus, e.g., the memory bus on the BMC-side). The following passages describes these components in relation to completing a transaction to access the BIOS/Boot image(s) stored in the memory element of the BMC system.

The first interface to a bus of the processor-based system can receive a transaction initiated by a processor of the processor-based system to access a first boot image stored on a memory element of the BMC system. This transaction (or any other messaging) is in a format/protocol suitable for issuing a transaction over the bus of the processor-based system (e.g., the SPI bus) to a peripheral device (e.g., an SPI device). However, the memory bus in the BMC system for accessing the memory element can follow a different format/protocol. Furthermore, the processor of the processor-based system is not aware of the location at which the first boot image is stored in the memory element (or the fact that the first boot image is stored in the memory element in the BMC system). To address these issues, the proxy between the first interface and the second interface can translate the received transaction to a translated transaction suitable for a memory bus of the BMC system connecting the bus-to-memory bridge to the memory element. The second interface to the memory bus of the BMC system can then issue the translated transaction onto a memory bus of the BMC system to access the first boot image stored on a memory element of the BMC system.

As explained in relation to the processes shown in FIGS. 5-6, the BMC informs the bus-to-memory of location information associated with one or more boot images managed by the BMC system. To store the information, the bus-to-memory bridge 902 can include a memory element as well (e.g., register(s) 910), such as a register for storing first location information indicating a first location at which the first boot image is stored in the memory element. Using the location information, the proxy can translate the received transactions using the first location information stored in the register (e.g., to access the first boot image in the proper area of the memory element in the BMC system).

After the memory element in the BMC system receives the translated transaction (e.g., requesting the first boot image or a part thereof), the memory element can transmit a response to the bus-to-memory bridge 902. The second interface would receive the response from the memory element to the translated transaction, and provide the response to the proxy for further processing. The proxy can translate the response (which can be in a format suitable for the memory bus of the BMC system) to a translated response suitable for the bus of the processor-based system connecting the processor to the bus-to-memory bridge.

Technical Benefits of the Improved Computer System

The overall system provides several parts of a technical solution. First, a peripheral device, traditionally a discrete memory element, storing the boot image is removed from the host-side. Second, the removed device is replaced/virtualized by a bus-to-memory bridge in the BMC-side, which provides the host-side with access to the boot image stored within a memory element of the BMC-side. The improved BMC system is in control of the boot image, and further more serves as a proxy between the host-side and the boot image. The resulting system provides better protection for the boot image, and a variety of technical benefits:

No initial bios present: The improved computer system ensures that the computer system cannot be run in any environment except for an approved environment, with a boot image validated and managed by the approved environment.

Higher level software decides what boot image to run: The improved computer system allows higher level software (e.g., an external computer management system) to quickly (because of the DRAM side of the implementation) replace a boot image on demand.

Boot images are kept in single repository, not on each board: The improved system enables all boot images are kept in a single vendor-approved repository (external to the computer system), where the boot images can be easily distributable for execution via Trivial File Transfer Protocol (TFTP) to the DRAM side of the bridge.

No change to host-side SPI interaction: The improved system ensures the host-side is transparent to the modifications made to the BMC side. Any device that transacts with the SPI devices of FIGS. 3 and 4 would continue to transact with this improved implementation of FIGS. 7 and 8 in exactly the same manner.

Pristine boot image on every boot: The improved system can provide validation where the boot image is validated for corruption and signature on every boot cycle.

Augmented malware protection: While the improved system cannot remove existence of host-side virus protection/malicious activity, the improved system, if any malware is able to get past the host-side protection, can monitor transactions issued to the bus-to-memory bridge, and/or repair any damage done by that malware either at power cycle or at reset of the host itself (or any other suitable moment where the security module validates the boot image).

BOM (Bill of Materials) cost reduction: The improved system obviates the need for providing discrete SPI devices having the BIOS/Boot image stored thereon.

VARIATIONS AND IMPLEMENTATIONS

While examples of QPI, SPI, SDR, and DDR buses/interfaces are mentioned, they were merely examples not intended to limit the scope of the disclosure. If other types of architectures and devices are used, other buses/interfaces can be provided to enable processor-to-peripheral, or processor-to-memory communication. Furthermore, while x86 and ARM architectures are mentioned, they were merely examples of processor-based system architectures, which are not intended to limit the scope of the disclosure. Other architectures for providing the host-side are also envisioned by the disclosure.

While the present disclosure describes improved mechanisms for managing boot images for computer systems in general, it is noted that the improved mechanisms are applicable to network equipment. Network equipment is meant to encompass any of the aforementioned elements, as well as servers (physical or virtual), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the boot image management operations thereof. This may be inclusive of appropriate algorithms and communication protocols that allow for the effective exchange of data or information.

In one implementation, computer systems described herein may include software to achieve (or to foster) the functions discussed herein for boot image management where the software is executed on one or more processors to carry out the functions. This could include the implementation of instances of BMCs, security module, bus-to-memory bridge and/or any other suitable element that would foster the activities discussed herein. Additionally, each of these elements can have an internal structure (e.g., a processor, a memory element, etc.) to facilitate some of the operations described herein. In other embodiments, these functions for boot image management may be executed externally to these elements, or included in some other network element to achieve the intended functionality. Alternatively, boot image management may include software (or reciprocating software) that can coordinate with other network elements in order to achieve the boot image management functions described herein. In still other embodiments, one or several devices may include any suitable algorithms, hardware, software, components, modules, interfaces, or objects that facilitate the operations thereof.

In certain example implementations, the boot image management functions outlined herein may be implemented by logic or instructions encoded in one or more non-transitory tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store location information associated with boot images stored in a BMC-side memory element disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

The BMC systems described herein can include memory elements for storing information to be used in achieving boot image management, as outlined herein. Additionally, each of these devices may include a processor that can execute software or an algorithm to perform the boot image management as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four elements. However, this has been done for purposes of clarity and example only. In certain cases, it may be easier to describe one or more of the functionalities of a given set of flows by only referencing a limited number of elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of boot image management, as potentially applied to a myriad of other architectures.

It is also important to note that the steps in the FIGS. 5 and 6 illustrate only some of the possible scenarios that may be executed by, or within, the computer systems described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by computer systems in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A bus-to-memory bridge for virtualizing boot images usable for booting a computer system comprising a processor-based system and a baseboard management controller (BMC) system, the bus-to-memory bridge comprising:
   a first interface to a bus of the processor-based system for receiving a transaction initiated by a processor of the processor-based system to access a first boot image stored on a memory element of the BMC system;
   a proxy between the first interface and the second interface for translating the received transaction to a translated transaction suitable for a memory bus of the BMC system connecting the bus-to-memory bridge to the memory element; and
   a second interface to the memory bus of the BMC system for issuing the translated transaction onto a memory bus of the BMC system to access the first boot image stored on a memory element of the BMC system.

2. The bus-to-memory bridge of claim 1, further comprising:

a register for storing first location information indicating a first location at which the first boot image is stored in the memory element; and wherein translating the received transactions to translated transactions comprises translating the received transactions using the first location information stored in the register.

3. The bus-to-memory bridge of claim 1, wherein:

the second interface is further configured to receive a response from the memory element to the translated transaction;

the proxy is further configured to translate the response to a translated response suitable for the bus of the processor-based system connecting the processor to the bus-to-memory bridge; and the first interface is further configured to transmit the translated response to the processor onto the bus of the processor-based system.

4. The bus-to-memory bridge of claim 1, wherein the bus-to-memory bridge is configured to proxy transactions initiated by one or more processors of the processor-based system onto a memory bus of the BMC system connecting the bus-to-memory bridge to the memory element.

5. The bus-to-memory bridge of claim 1, wherein the bus of the processor-based system is a Serial Peripheral Interface (SPI) bus.

6. A method for a bus-to-memory bridge interface between a processor-based system and a baseboard management controller (BMC) system, the method comprising:

receiving, by the bus-to-memory bridge, a transaction initiated by a processor of the processor-based system to access a first boot image stored on a memory element of the BMC system;

translating the received transaction to a translated transaction suitable for a memory bus of the BMC system connecting the bus-to-memory bridge to the memory element; and issuing the translated transaction onto a memory bus of the BMC system to access the first boot image stored on a memory element of the BMC system.

7. The method of claim 6, further comprising:

storing, in a register on the bus-to-memory bridge, the first location information indicating a first location at which the first boot image is stored in the memory element; and translating the received transactions using the first location information stored in the register.

8. The method of claim 6, further comprising:

receiving, by the bus-to-memory bridge, a second transaction initiated by a processor of the processor-based system to access an updated first boot image stored at a second location on the memory element of the BMC system;

translating the received second transaction to a translated transaction suitable for a memory bus of the BMC system connecting the bus-to-memory bridge to the memory element; and issuing the translated second transaction onto the memory bus of the BMC system to access the updated first boot image stored at the second location on the memory element of the BMC system.

* * * * *